(12) United States Patent
Rowland et al.

(10) Patent No.: US 10,710,509 B2
(45) Date of Patent: Jul. 14, 2020

(54) COLLAPSIBLE STORAGE BIN FOR A MOTOR VEHICLE

(71) Applicants: FORD GLOBAL TECHNOLOGIES, LLC, Dearborn, MI (US); Yanfeng US Automotive Interior Systems I LLC, Holland, MI (US)

(72) Inventors: Jeffrey R. Rowland, Brighton, MI (US); Douglas Robert Thompson, Hudsonville, MI (US); Allan Wayne Getliff, Holland, MI (US); Chris James Harmelink, Grandville, MI (US); Kenneth John Hulst, Wayland, MI (US); Tyler James Newkirk, Grand Rapids, MI (US); Randy William Nurenberg, Hudsonville, MI (US); Rick Alan Anderson, Grand Haven, MI (US)

(73) Assignees: Ford Global Technologies, LLC, Dearborn, MI (US); Yanfeng US Automotive Interior Systems I LLC, Holland, MI (US)

( * ) Notice: Subject to any disclaimer, the term of this patent is extended or adjusted under 35 U.S.C. 154(b) by 732 days.

(21) Appl. No.: 14/855,511

(22) Filed: Sep. 16, 2015

(65) Prior Publication Data

US 2017/0072863 A1 Mar. 16, 2017

(51) Int. Cl.
*B60R 7/04* (2006.01)

(52) U.S. Cl.
CPC .................................. *B60R 7/043* (2013.01)

(58) Field of Classification Search
CPC .. B65D 11/186; B65D 21/086; B65D 11/184; B65D 11/1873; B65D 11/1846; B65D 11/1853; B65D 11/1866; B65D 11/1833; B60R 13/013; B60R 13/011; B60R 7/02; B60R 7/043; B60R 7/04386; B60R 9/065; Y10S 224/925
(Continued)

(56) References Cited

U.S. PATENT DOCUMENTS 1,905,890 A * 4/1933 Blakely ................... B60R 5/041
190/21
3,987,945 A 10/1976 McDowell
(Continued)

FOREIGN PATENT DOCUMENTS

JP          200135950 A        5/2000
WO     WO-0066440 A1 *  11/2000   .......... B65D 11/1833
WO         02092391 A1       11/2002

OTHER PUBLICATIONS

English machine translation of JP2000135950A dated May 16, 2000.

*Primary Examiner* — Nathan J Newhouse
*Assistant Examiner* — Matthew T Theis
(74) *Attorney, Agent, or Firm* — David Coppielle; King & Schickli, PLLC

(57) ABSTRACT

A collapsible storage bin is provided for a motor vehicle. The collapsible storage bin includes a first sidewall that is displaceable between a collapsed position and an erected position. First and second self-erecting end walls are connected to the first sidewall. Further, an end wall locking handle is provided. That end wall locking handle is displaceable between a stowed position and an end wall locking position that functions to secure the storage bin in the erected position.

18 Claims, 18 Drawing Sheets

(58) Field of Classification Search
USPC ............... 224/542, 539, 275; 220/6, 7, 666, 220/4.33–4.34; 297/188.09, 188.08, 297/188.1, 188.13; 229/117.07; 190/21; 217/8, 12 R
See application file for complete search history.

(56) References Cited

U.S. PATENT DOCUMENTS

| | | |
|---|---|---|
| 6,056,177 A | 5/2000 | Schneider |
| 6,161,896 A | 12/2000 | Johnson et al. |
| 6,401,995 B1 | 6/2002 | Yuille et al. |
| 6,520,364 B2 | 2/2003 | Spykerman et al. |
| 6,609,744 B2 | 8/2003 | Gehring |
| 8,356,853 B2 | 1/2013 | Huber et al. |
| 8,770,661 B2 | 7/2014 | Kalergis et al. |
| 8,910,988 B2 | 12/2014 | Brinas |
| 9,016,749 B2 | 4/2015 | Mueller et al. |
| 9,079,513 B2 | 7/2015 | Line et al. |
| 2001/0020631 A1* | 9/2001 | Spykerman ............... B60R 7/02 224/539 |
| 2005/0242138 A1 | 11/2005 | Warganich |
| 2012/0024846 A1* | 2/2012 | Pittrich ............. B65D 11/1833 220/6 |
| 2013/0161330 A1* | 6/2013 | Gualersi ............ B65D 11/1833 220/529 |
| 2015/0084360 A1* | 3/2015 | Mueller ................. B60R 5/006 296/37.5 |

\* cited by examiner

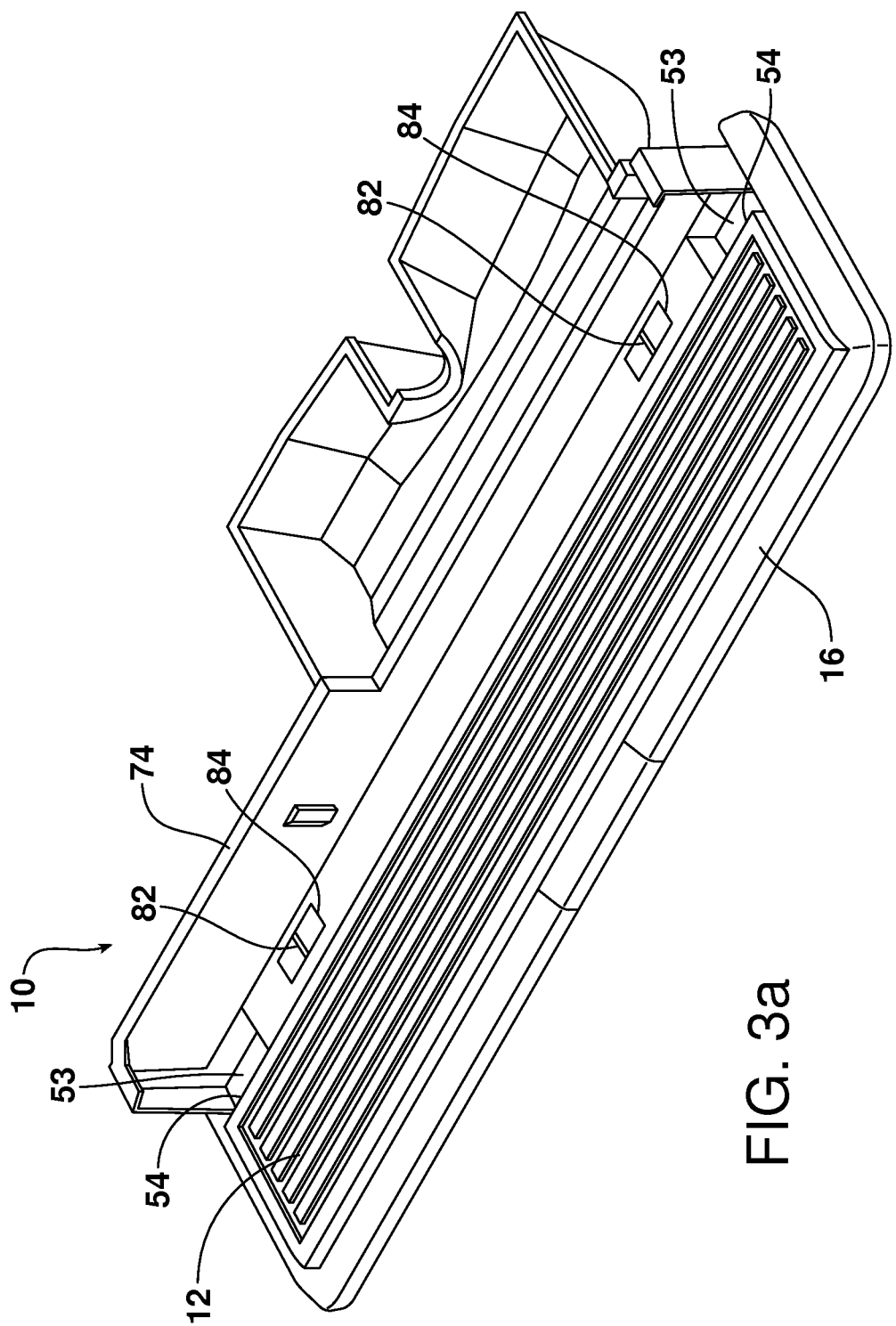

COLLAPSIBLE STORAGE BIN FOR A MOTOR VEHICLE

TECHNICAL FIELD

This document relates generally to the motor vehicle equipment field and, more particularly, to a collapsible storage bin including a collapsible sidewall, self-erecting end walls and an end wall locking handle used to lock and unlock the collapsible storage bin in the erected condition from either side of the motor vehicle.

BACKGROUND

Collapsible storage bins, including those that are provided under a seat of a motor vehicle such as the second row seat in a crew cab pickup truck, are well known to those in the art. Such bins are very useful for holding small items such as tools and the like.

This document relates to a new and improved collapsible storage bin comprising a single displaceable sidewall connected to two self-erecting end walls. Such a construction allows the storage bin to be quickly and easily erected. Further, the collapsible storage bin includes an end wall locking handle or lever to secure the storage bin in the erected position. Advantageously, the end wall locking handle functions from either side of the vehicle, thereby providing enhanced operator convenience. When the collapsible storage bin is collapsed, the outer face of the displaceable sideweall defines a flat load floor.

SUMMARY

In accordance with the purposes and benefits described herein, a collapsible storage bin is provided for a motor vehicle. That collapsible storage bin comprises a first sidewall displaceable between a collapsed position and an erected position, a first self-erecting end wall connected to the first sidewall, a second self-erecting end wall connected to the first sidewall and an end wall locking handle. The end wall locking handle is displaceable between a stowed position and an end wall locking position.

In one possible embodiment, the first self-erecting end wall includes a first panel pivotally connected to the first sidewall by a first hinge and a second panel pivotally connected to the first panel by a second hinge. Further, the collapsible storage bin includes a bottom wall. The second panel is pivotally connected to the bottom wall by a third hinge. In one possible embodiment, the first hinge is substantially perpendicular to the third hinge and the second hinge substantially bisects the first hinge and the third hinge.

In accordance with an additional aspect, a first spring latch is carried on the first panel and a first latching channel is carried on the end wall locking handle. The first spring latch engages in the first latching channel when the end wall locking handle is in the end wall locking position, securing the first self-erecting end wall in an erected position.

The first sidewall includes a first recess for receiving the first panel when the first sidewall is in the collapsed position. Further, the collapsible storage bin includes a partition panel that is pivotally connected to the first sidewall between the first self-erecting end wall and the second self-erecting end wall.

In one possible embodiment, the second self-erecting end wall includes a third panel pivotally connected to the first sidewall by a fourth hinge and a fourth panel pivotally connected to the third panel by a fifth hinge. Further, the fourth end wall is pivotally connected to the bottom wall by a sixth hinge.

Still further, a second spring latch is carried on the third panel and a second latching channel is carried on the end wall locking handle. The second spring latch engages the second latching channel when the end wall locking handle is in the end wall locking position securing the second self-erecting end wall in an erected position.

The first sidewall may also include a second recess for receiving the third panel when the first sidewall is in the collapsed position.

In one possible embodiment, the end wall locking handle is substantially U-shaped and includes two opposed operating ends. A first of the two opposed operating ends is provided adjacent a first side of the motor vehicle while a second of the two opposed operating ends is provided adjacent a second side of the motor vehicle. Thus, the end wall locking handle is functional from either side of the motor vehicle and may be easily accessed by the operator.

In still another embodiment, the bottom wall of the collapsible storage bin is integrated into a floor of the motor vehicle under a folding seat. Still further, the collapsible storage bin may include a second side wall wherein the second sidewall and the bottom wall define a cavity for receiving the first sidewall when the first sidewall is in a collapsed position.

In accordance with yet another aspect, a motor vehicle is provided incorporating the collapsible storage bin.

In the following description, there are shown and described several preferred embodiments of the collapsible storage bin. As it should be realized, the collapsible storage bin is capable of other, different embodiments and its several details are capable of modification in various, obvious aspects all without departing from the collapsible storage bin as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the collapsible storage bin and together with the description serve to explain certain principles thereof. In the drawing figures:

FIGS. 3a-3e are various views illustrating the manner of erecting the storage bin from the collapsed position to the fully erected position by pivoting the first sidewall and using the end wall locking handle to secure the storage bin in the erected position.

Reference will now be made in detail to the present preferred embodiments of the collapsible storage bin, examples of which are illustrated in the accompanying drawing figures.

DETAILED DESCRIPTION

Figure 1A:
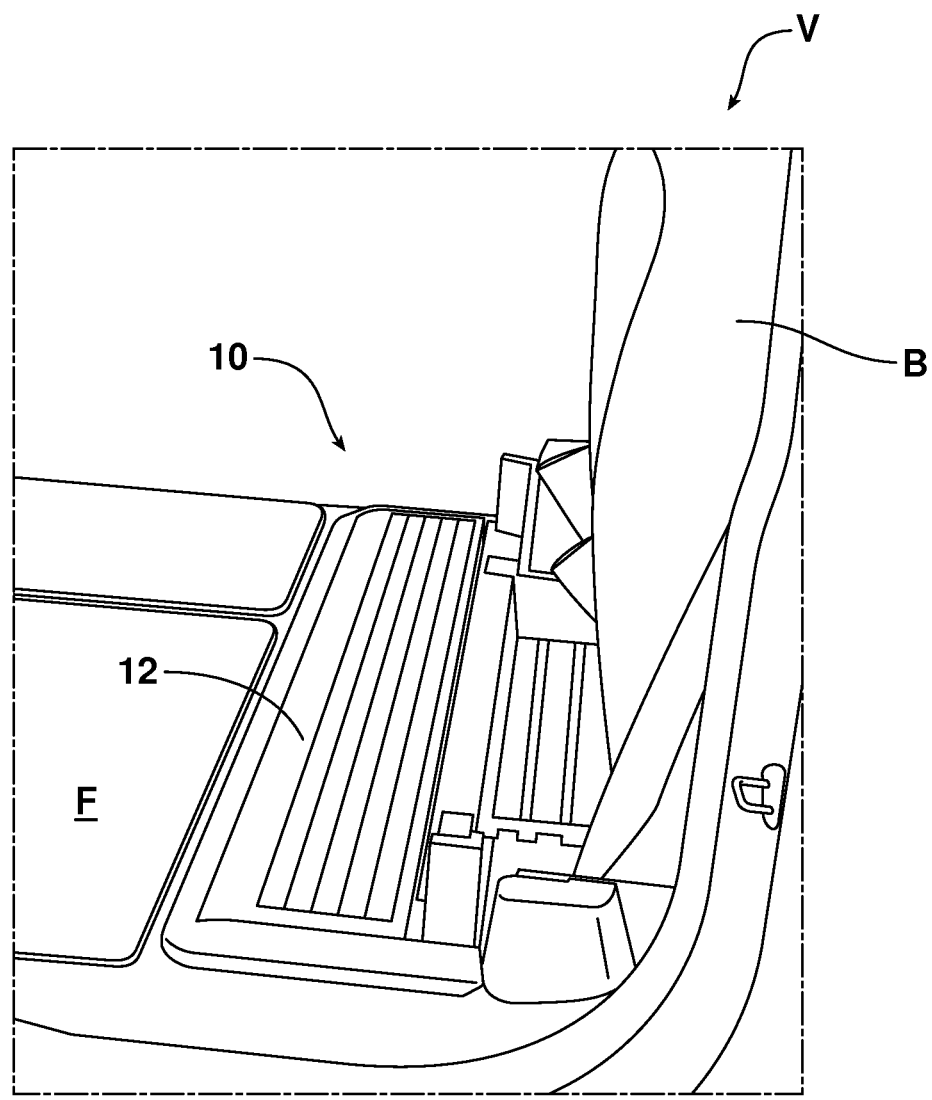
FIG. 1a is a perspective view of the collapsible storage bin in the collapsed position.
Figure 1B:
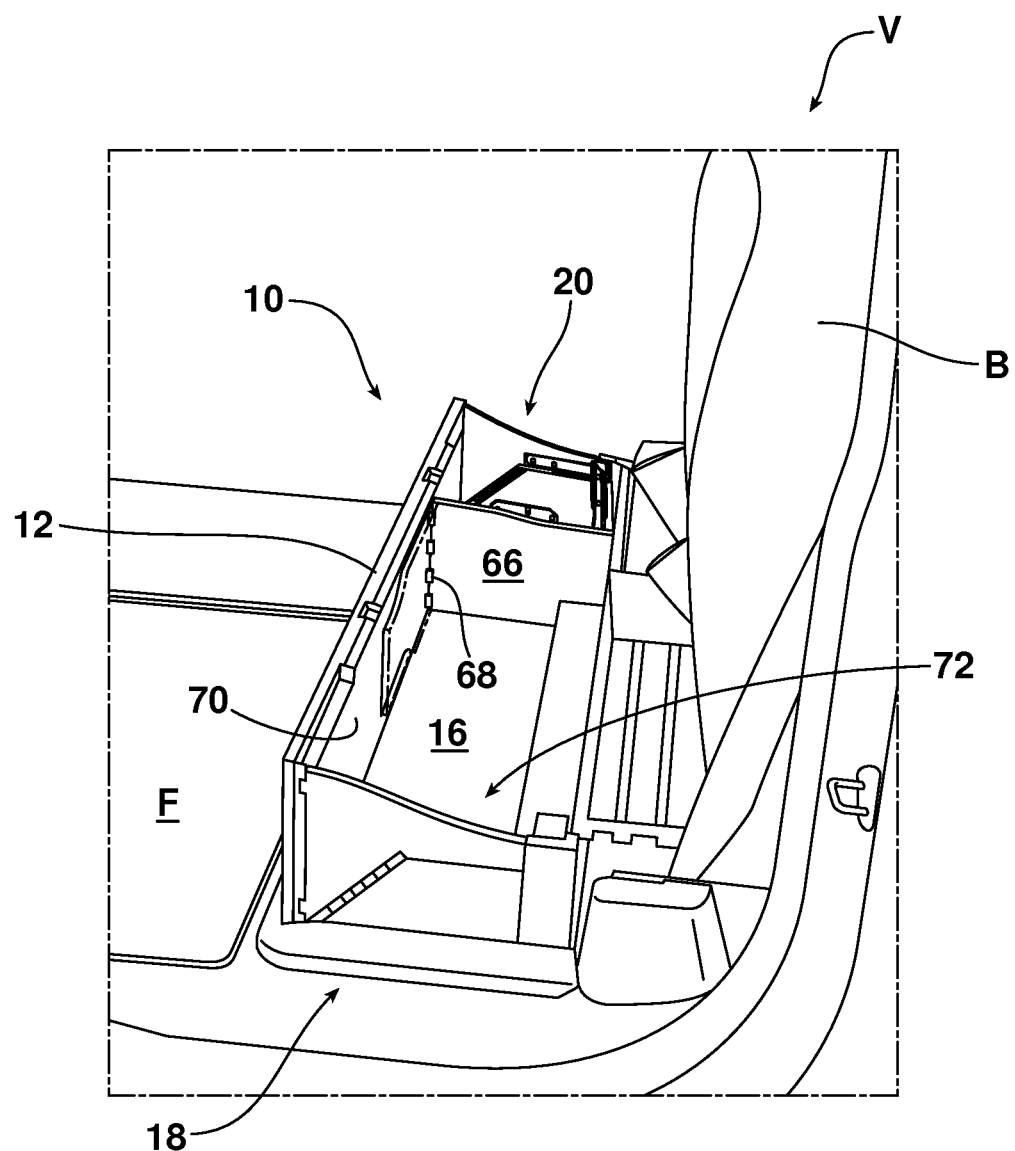
FIG. 1b is a perspective view of the collapsible storage bin in the fully erect position with the self-erecting end walls locked in position.
Figure 2A:
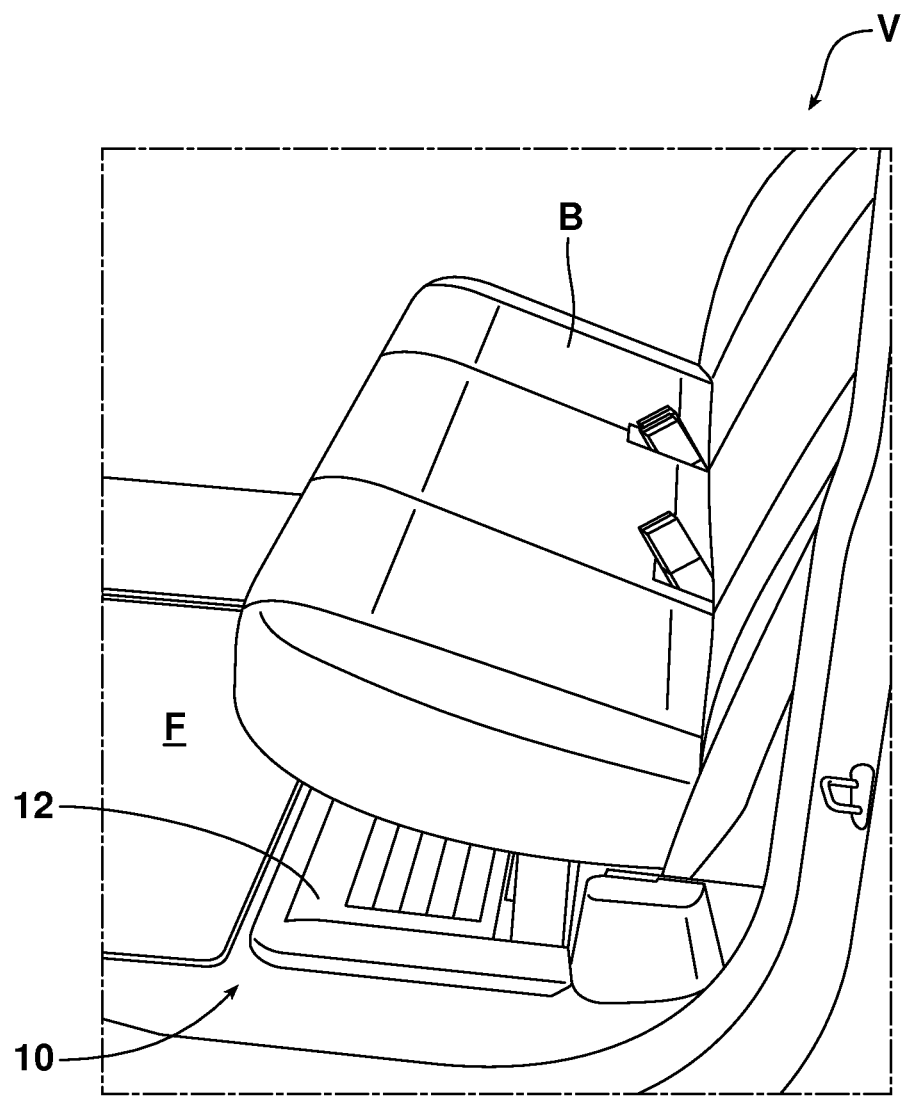
FIG. 2a is a perspective view of the collapsible storage bin in the collapsed position with the rear seats of the motor vehicle folded down so as to overlie the storage bin.
Figure 2B:
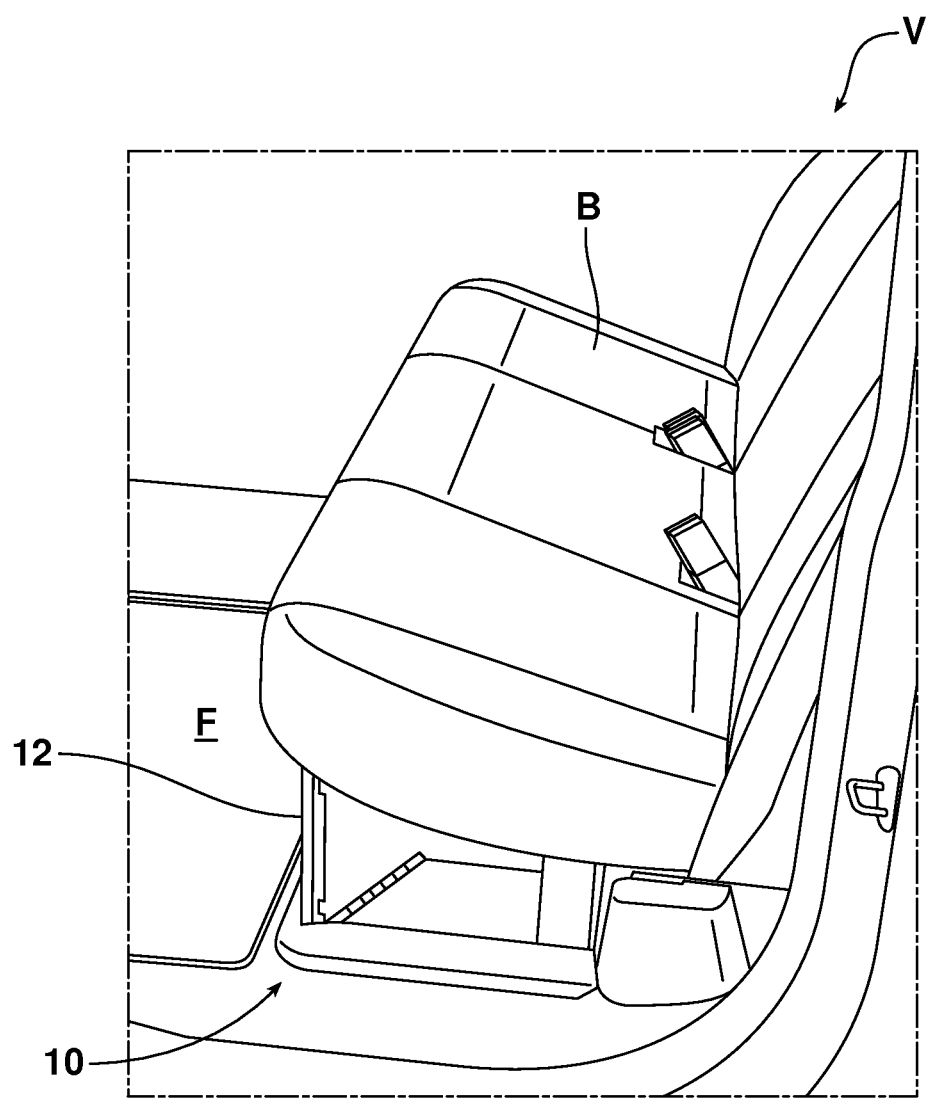
FIG. 2b is a perspective view of the collapsible storage bin in the erected position, again with the rear seats folded down so as to overlie the storage bin.

Reference is now made to FIGS. 1a, 1b, 2a and 2b illustrating a collapsible storage bin 10 that is the subject matter of this document, integrated into the floor F of a motor vehicle such as the illustrated pickup truck V. FIG. 1a illustrates the collapsible storage bin 10 in the collapsed position flat on the floor F with the folding rear seat bottom B folded up against the rear of the motor vehicle cab, while FIG. 1b illustrates the storage bin 10 in the fully erected position with the seat bottom B in the same configuration. FIGS. 2a and 2b respectively illustrate the collapsible storage bin 10 in the collapsed and fully erected positions with the seat bottom B folded down in a seating position and overlying the storage bin.

Figure 3B:
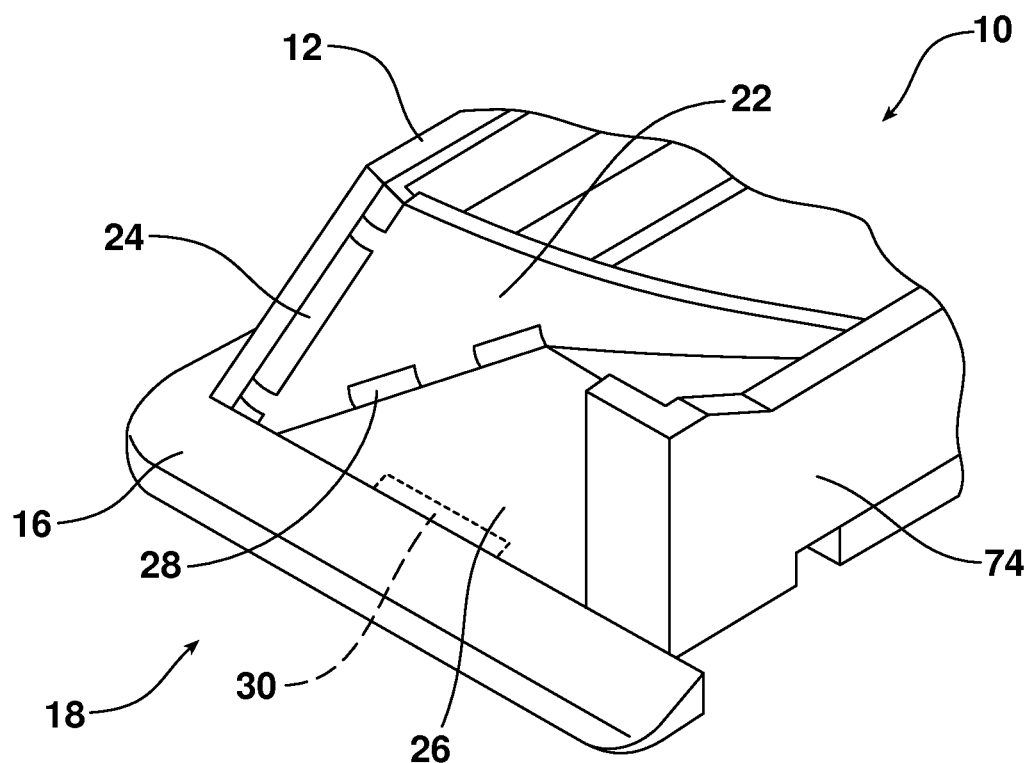
Figure 3C:
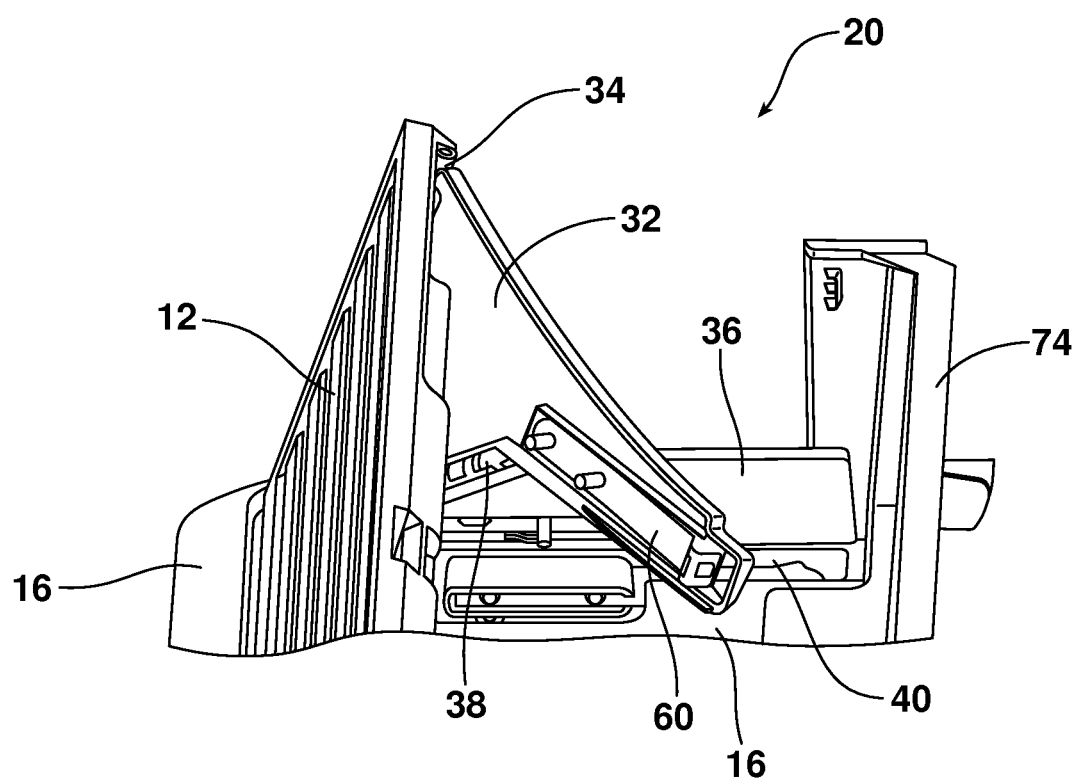
Figure 3D:
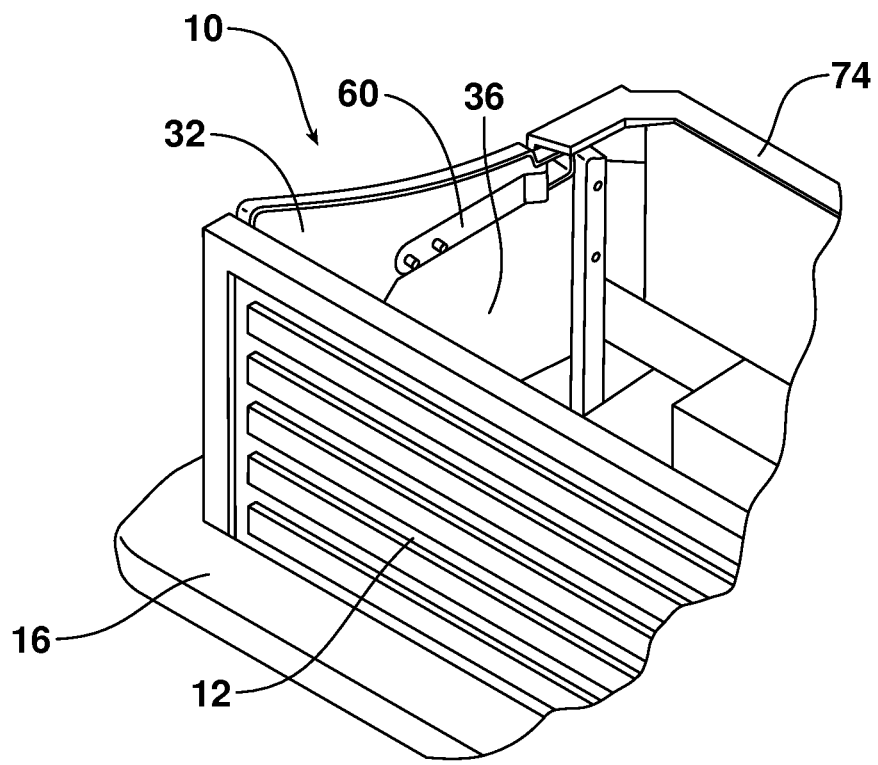
Figure 3E:
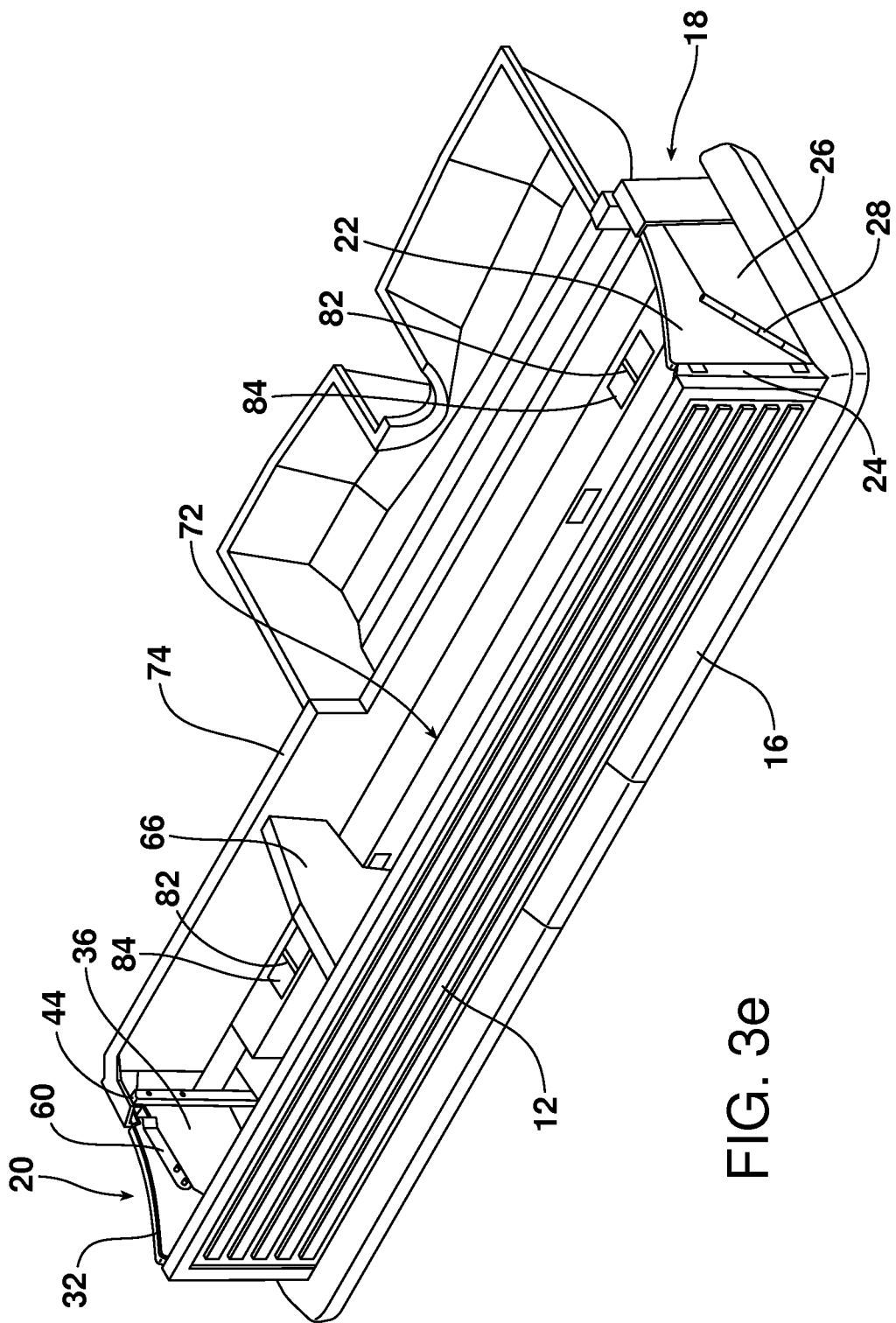

As best illustrated in FIGS. 1a, 2a, 3a-3f, 4 and 5a-5c, the collapsible storage bin 10 includes a first or forward sidewall 12 that is displaceable between the collapsed position illustrated in FIGS. 1a and 3a wherein the sidewall 12 extends horizontally along the floor and a fully erected or upright position illustrated in FIGS. 1b and 3e wherein the sidewall 12 extends in a vertical position. In the illustrated embodiment, the sidewall 12 is connected by means of a series of hinges 14 (one of which is clearly illustrated in FIG. 6) to a bottom wall 16 of the storage bin 10. A first self-erecting end wall 18 is connected between a first end of the sidewall 12 and the bottom wall 16 and a second self-erecting end wall 20 is connected between a second end of the sidewall 12 and the bottom wall 16.

In the illustrated embodiment, the first self-erecting end wall 18 includes a first panel 22 pivotally connected to the sidewall 12 by a first hinge 24 and a second panel 26 pivotally connected to the first panel by a second hinge 28. The second panel 26 is also pivotally connected to the bottom wall 16 by a third hinge 30. In the illustrated embodiment, the axial line of the first hinge 24 is substantially perpendicular to the axial line of the third hinge 30 while the axial line of the second hinge 28 substantially bisects the axial lines of the first and third hinges 24, 30.

Similarly, the second self-erecting end wall 20 includes a third panel 32 connected by a fourth hinge 34 to the sidewall 12 and a fourth panel 36 connected by a fifth hinge 38 to the third panel and by a sixth hinge 40 to the bottom wall 16. As should be appreciated, the fourth, fifth and sixth hinges 34, 38 and 40 have an orientation geometry that is a mirror image of the first, second and third hinges 24, 28 and 30.

Figure 3F:
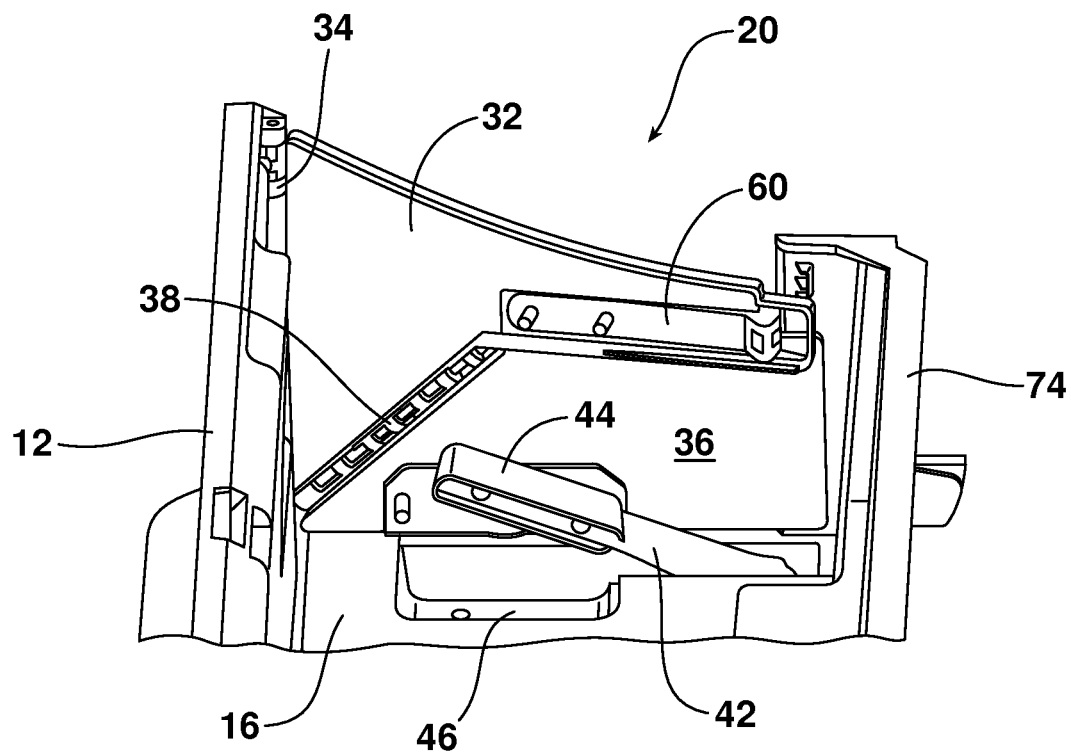
FIGS. 3f-3i are detailed perspective views illustrating the locking of the storage bin in the fully erected position by means of the end wall locking handle.
Figure 3G:
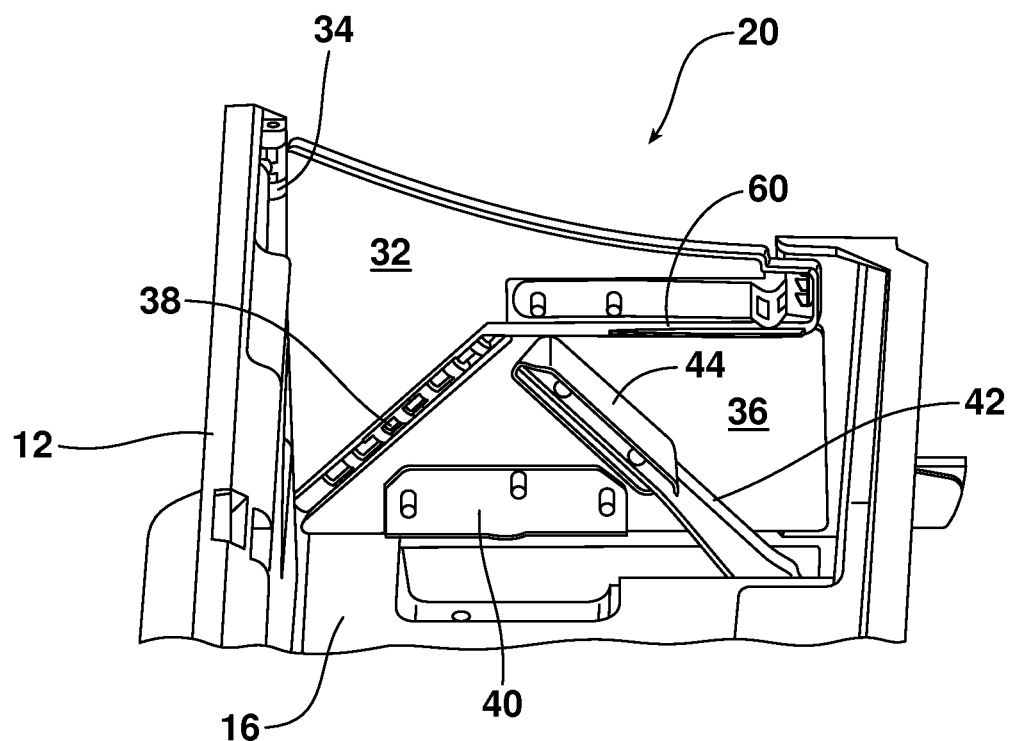
Figure 3H:
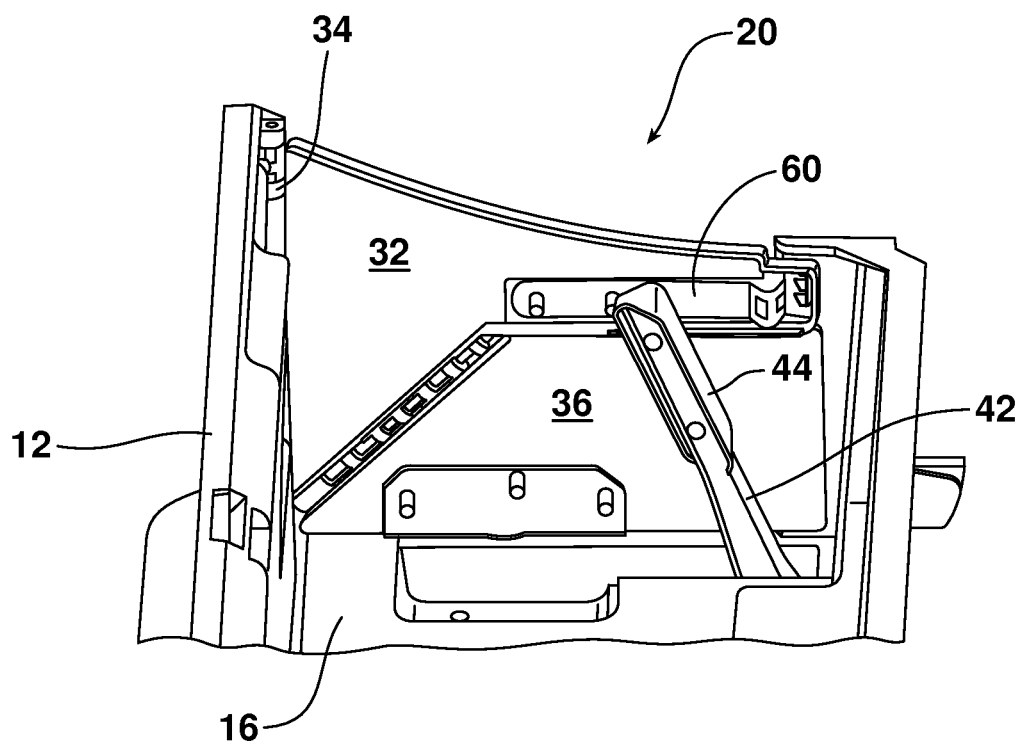
Figure 3I:
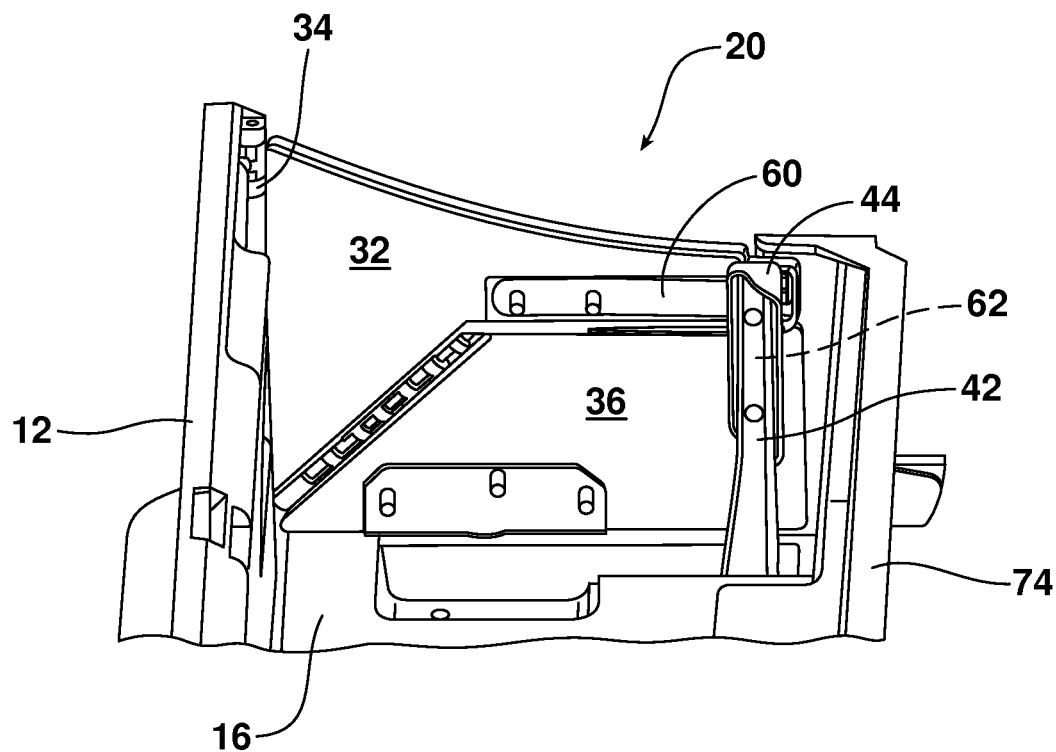
Figure 4:
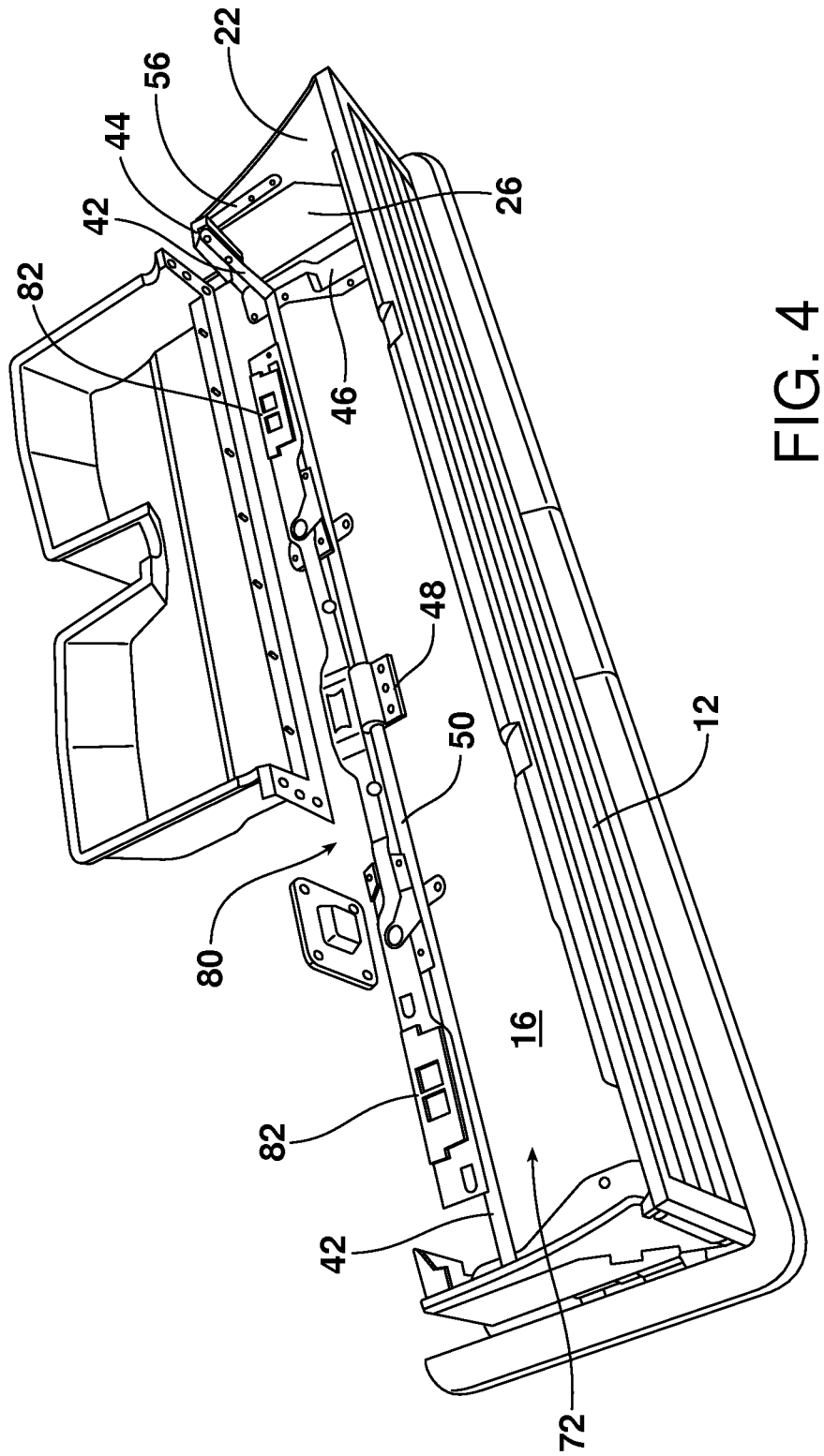
FIG. 4 is a perspective view of the collapsible storage bin with the bin bottom wall removed to illustrate the U-shaped end wall locking handle.

As best illustrated in FIGS. 3f-3i and 4, the collapsible storage bin 10 also includes an end wall locking lever or handle 42 that is substantially U-shaped and includes two opposed operating ends 44. As best illustrated in FIG. 4, the median portion 50 of the end wall locking handle 42 is captured between one or more retainers 48 in the bottom wall 16 while allowing for rotation of the handle 42 with respect to the bottom wall 16. As illustrated, the end wall locking handle 42 is displaceable between (a) the stowed position wherein the handle 42 rests in a horizontal plane with the operating ends 44 received in cooperating recesses 46 in the bottom wall 16 and (b) the end wall locking position wherein the operating ends 44 extend substantially vertically and function to lock the collapsible storage bin 10 in the fully erected position in a manner that will be described in greater detail below.

As should be appreciated, the storage bin 10 extends across the motor vehicle V between the opposed sides thereof, and the operating ends 44 of the locking handle 42 may be easily accessed from either side of the vehicle V when the rear doors are opened. Thus, it should be appreciated that the end wall locking handle 42 may be easily accessed and manipulated by an operator from either side of the vehicle V for added operator convenience.

Reference is now made to FIGS. 3a-3f which illustrate in series how a user erects the storage bin 10 from the collapsed condition illustrated in FIG. 3a to the fully erected position illustrated in FIG. 3f. As should be appreciated, a user may do this from either side of the motor vehicle V. This is done by reaching a hand into a hand hold 52 formed adjacent either side of the bottom wall 16 along the free edge 54 of the first sidewall 12. The user then grasps the sidewall 12 and pivots the sidewall about the hinges 14 from the substantially horizontal position illustrated in FIG. 3a to the substantially vertical position illustrated in FIG. 3f. As the first sidewall 12 is pivoted upwardly, the first and second self-erecting end walls 18, 20 are also erected into a vertical orientation. More specifically, the first and second panels 22, 26 of the first self-correcting end wall 18 pivot about the hinges 24, 28 and 30 with respect to the first sidewall 12, the bottom wall 16 and each other. At the same time, the third and fourth panels 32, 36 of the second self-correcting end wall 20 pivot about the fourth fifth and sixth hinges 34, 38 and 40 with respect to the first sidewall 12, the bottom wall 16 and each other. See FIGS. 3b-3d.

When the first sidewall 12 and the first and second self-erecting end walls 18, 20 are all in a fully erected, vertical orientation, the user reaches a hand into the storage compartment of the erected bin 10 and down into the recess 46 to grasp an operating end 44 of the end wall locking handle 42. As noted previously, this can be done from either side of the motor vehicle. Next, the operator pivots the locking handle 42 rearwardly until the operating ends 44 are brought into a vertical position (see FIGS. 3f-3i). As this is done, the first spring latch 56 engages in the first latching channel 58 provided on the first panel 22 at a first end of the locking end wall handle 42 (see FIGS. 5a and 5b). Simultaneously, the second spring latch 60 carried on the third panel 32 engages in the second latching channel 62 provided at a second end of the locking end wall handle 42. As should be appreciated, the spring latches 56, 60 function to secure the end wall locking handle 42 in the upright position where the vertically oriented operating ends 44 engage with, support and lock the self-erecting end walls 18, 20 in the upright position. At the same time, the handle 42 simultaneously functions to lock the first sidewall 12 in the upright or erected position.

As illustrated in FIG. 5, the collapsible storage bin 10 may also include a partition panel 66 that is pivotally connected by means of a hinge 68 to the inner face 70 of the first sidewall 12. That partition panel 66 may be extended across the storage compartment 72 of the storage bin 10 between the first sidewall 12 and the second or opposed sidewall 74 so as to divide the storage compartment as shown. While only one partition panel 66 is illustrated, it should be appreciated that more may be provided if desired.

Figure 5A:
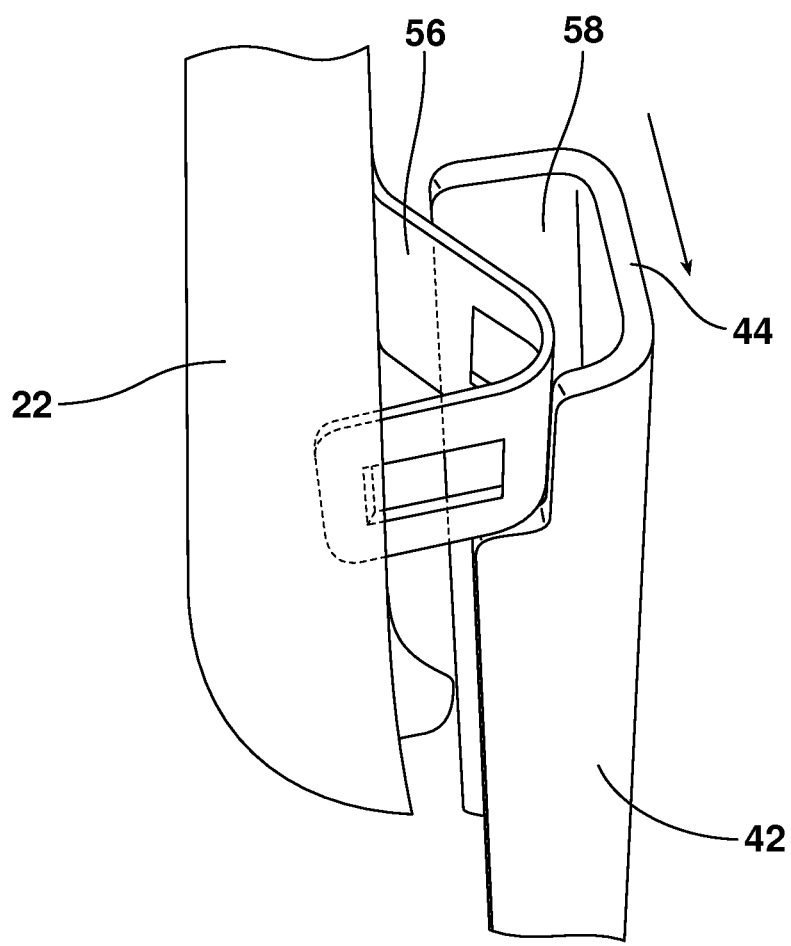
FIGS. 5a-5c are detailed perspective views illustrating the locking and unlocking of a spring latch with the end wall locking handle.
Figure 5B:
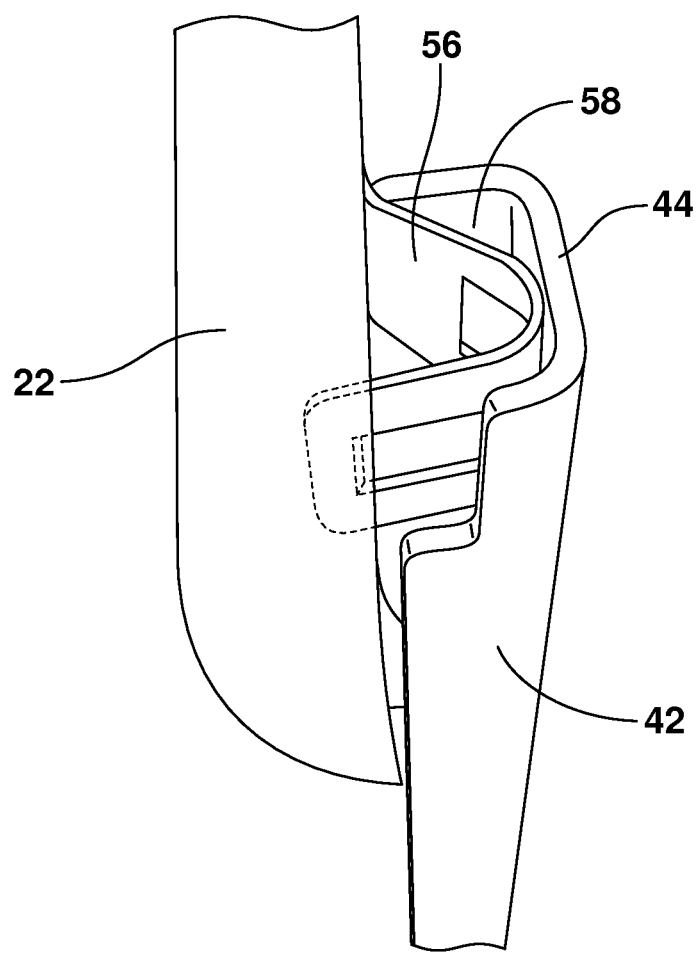
Figure 5C:
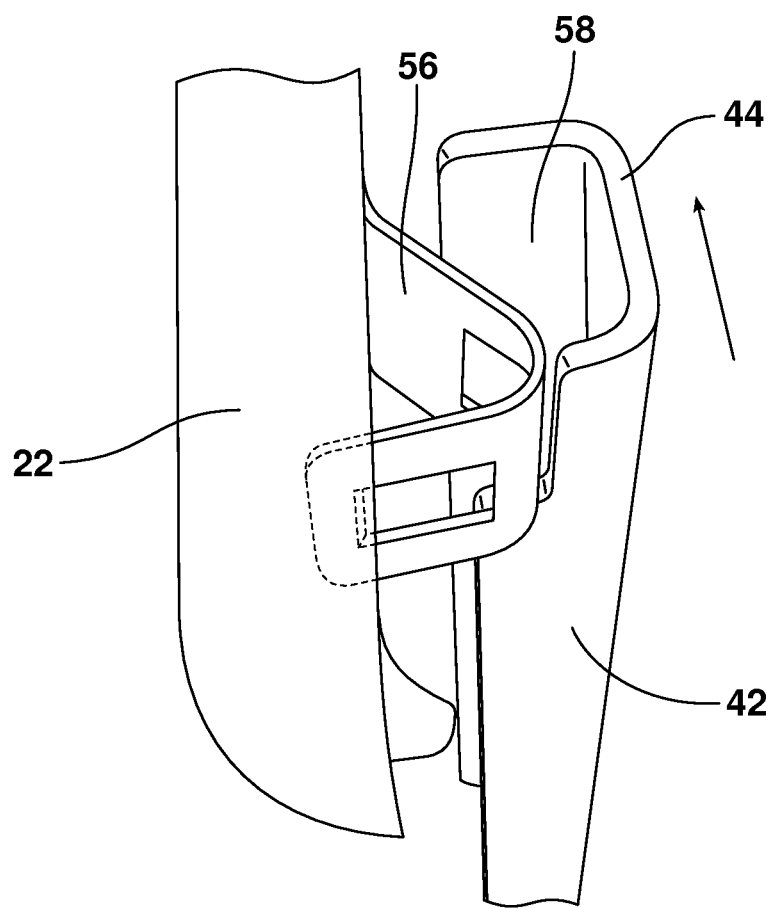
Figure 6:
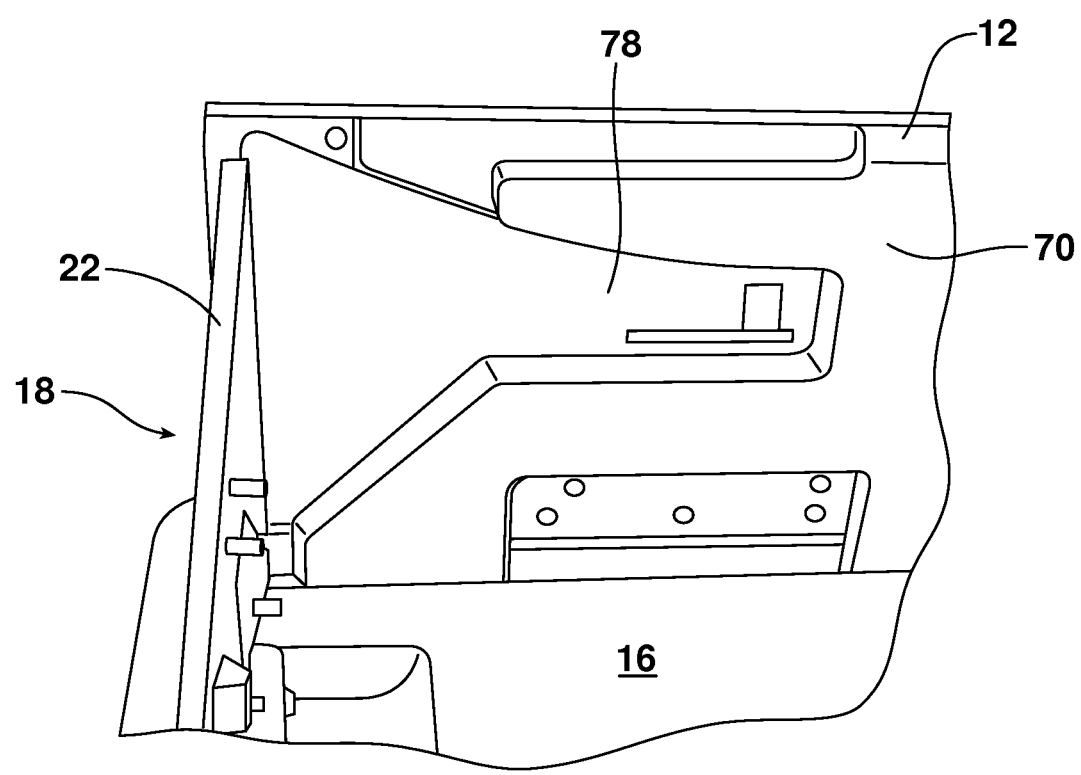
FIG. 6 is a detailed perspective view of the inner wall of the first sidewall including the recess that receives the first panel of the first self-erecting end wall when the first sidewall is in the collapsed position.

When it is desired to return the storage bin 10 to its collapsed position, the user first pivots the partition panel 66 about the hinge 68 so as to lie flat in a recess against the inner face 70 of the sidewall 12. Next, as illustrated in FIG. 5c, the user pivots the end wall locking handle 42 with sufficient force to overcome the locking action of the first and second spring latches 58, 64 and returns the operating ends 44 downward back into the recesses 46 formed in the bottom wall 16. This unlocks the first and second self-erecting end walls 18, 20. The operator may then pivot the first sidewall 12 downwardly about the hinges 14, causing the first and second panels 22, 26 to fold about the first, second and third hinges 24, 20 and 30 and the third and fourth panels 32, 36 to fold about the fourth, fifth and sixth hinges 34, 38 and 40 so that the end walls 18, 20 fold inwardly and downwardly upon the bottom wall 16. When fully collapsed, the sidewall 12 of the storage bin 10 rests within a cavity formed in the bottom wall 16 and the second rear sidewall 74. Here it should be further appreciated that the first and third panels 22, 32 are received in cooperating recesses 78 formed in the inner face 70 of the sidewall 12 (see FIG. 6). This provides the necessary clearance to allow the first sidewall 12 to be folded flat so that when collapsed, the storage bin 10 is fully integrated into the floor of the motor vehicle V under the folding seat bottom B. A slide lock, generally designated by reference number 80 receives the storage bin 10 in the collapsed position with the sidewall 12 folded flat. See FIGS. 3a, 3e and 4. Lock handles 82 to manipulate the slide lock 80 extend through openings 84 in the bottom wall 16. These handles 82 are positioned to be easily accessible from either side of the motor vehicle V.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A collapsible storage bin for a motor vehicle, comprising:
   a first sidewall displaceable between a collapsed position and an erected position;
   a first self-erecting end wall connected to said first sidewall;
   a second self-erecting end wall connected to said first sidewall;
   a bottom wall; and
   a single end wall locking handle retained against and carried by the bottom wall and displaceable between a stowed position and an end wall locking position wherein said first self-erecting end wall and said second self-erecting end wall are both engaged by said single end wall locking handle and secured in said erected position.

2. The collapsible storage bin of claim 1 wherein said first self-erecting end wall includes a first panel pivotally connected to said first sidewall by a first hinge and a second panel pivotally connected to said first panel by a second hinge.

3. The collapsible storage bin of claim 2, wherein said second panel is pivotally connected to said bottom wall by a third hinge.

4. The collapsible storage bin of claim 3, wherein the axial line of said first hinge is substantially perpendicular to the axial line of said third hinge and the axial line of said second hinge substantially bisects the axial lines of said first hinge and said third hinge.

5. The collapsible storage bin of claim 3, further including a first spring latch carried on said first panel and a first latching channel carried on said end wall locking handle, said first spring latch engaging said first latching channel when said end wall locking handle is in said end wall locking position securing said first self-erecting end wall in an erected position.

6. The collapsible storage bin of claim 5, wherein said first sidewall includes a first recess for receiving said first panel when said first sidewall is in said collapsed position.

7. The collapsible storage bin of claim 6, further including a partition panel pivotally connected to said first sidewall between said first self-erecting end wall and said second self-erecting end wall.

8. The collapsible storage bin of claim 7 wherein said second self-erecting end wall includes a third panel pivotally connected to said first sidewall by a fourth hinge and a fourth panel pivotally connected to said third panel by a fifth hinge.

9. The collapsible storage bin of claim 8, wherein said fourth panel is pivotally connected to said bottom wall by a sixth hinge.

10. The collapsible storage bin of claim 9, further including a second spring latch carried on said third panel and a second latching channel carried on said end wall locking handle, said second spring latch engaging said second latching channel when said end wall locking handle is in said end wall locking position securing said second self-erecting end wall in an erected position.

11. The collapsible storage bin of claim 10, wherein said first sidewall includes a second recess for receiving said third panel when said first sidewall is in said collapsed position.

12. The collapsible storage bin of claim 11, wherein said end wall locking handle includes two opposed operating ends, a first of said two opposed operating ends being provided adjacent a first side of said motor vehicle and a second of said two opposed operating ends being provided adjacent a second side of said motor vehicle where said opposed operating ends may be easily accessed by an operator wherein said first of said two opposed locking ends engages said first self-erecting end wall and said second of said two opposed operating ends engages said second self-erecting end wall when said single end wall locking handle is in said end wall locking position.

13. The collapsible storage bin of claim 12, wherein said bottom wall is integrated into a floor of said motor vehicle under a folding seat.

14. The collapsible storage bin of claim 13, further including a second sidewall, said second sidewall and said bottom wall defining a cavity for receiving said first sidewall when in said collapsed position.

15. The collapsible storage bin of claim 1, wherein said end wall locking handle includes two opposed operating ends, a first of said two opposed operating ends being provided adjacent a first side of said motor vehicle and a second of said two opposed operating ends being provided adjacent a second side of said motor vehicle whereby said end wall locking handle is functional from either side of said motor vehicle.

16. A collapsible storage bin for a motor vehicle, comprising:
   a pivoting sidewall;

a bottom wall;

two self-erecting end walls connected to said sidewall; and a single end wall locking handle retained on said bottom wall and engaging both of said two self-erecting end walls and securing said pivoting sidewall and said two self-erecting end walls in an erected position.

17. The collapsible storage bin of claim 16, wherein said end wall locking handle is functional from either side of said motor vehicle.

18. The collapsible storage bin of claim 17, further including said bottom wall integrated into a floor of said motor vehicle under a folding seat.

\* \* \* \* \*